United States Patent [19]

Blaisdell et al.

[11] 4,389,700

[45] Jun. 21, 1983

[54] PROJECTION UNIT WITH SEPARABLE LAMP CAPSULE AND SLIDABLE MEANS FOR EJECTING SAME

[75] Inventors: Ronald G. Blaisdell, Saugus; Harold L. Hough, Beverly, both of Mass.

[73] Assignee: GTE Products Corporation, Stamford, Conn.

[21] Appl. No.: 253,333

[22] Filed: Apr. 13, 1981

[51] Int. Cl.³ .............................................. F21V 7/00
[52] U.S. Cl. ..................................... 362/306; 362/296
[58] Field of Search .................. 362/16, 72, 83, 95, 362/226, 257, 296, 306, 317, 341, 350, 362, 382, 396, 433, 434, 435, 457, 458; 313/113, 318, 49, 51, 222; 352/198, 203; 354/141, 143, 148

[56] References Cited

U.S. PATENT DOCUMENTS

| | | | |
|---|---|---|---|
| 2,264,951 | 12/1941 | Naysmith | 362/306 |
| 2,864,938 | 12/1958 | Shaw et al. | 354/143 X |
| 3,314,331 | 4/1967 | Wiley | 362/296 X |
| 3,502,864 | 3/1970 | Wagner | 362/306 |
| 3,621,232 | 11/1971 | Hough et al. | 362/306 X |
| 3,639,750 | 2/1972 | Anthonijsz | 362/226 |
| 3,731,133 | 5/1973 | McRae et al. | 362/341 X |
| 3,789,212 | 1/1974 | Wagner | 362/306 |
| 4,156,901 | 5/1979 | Haraden et al. | 362/296 |
| 4,219,870 | 8/1980 | Haraden et al. | 362/350 X |
| 4,320,439 | 3/1982 | Wiley | 362/296 X |

FOREIGN PATENT DOCUMENTS

| | | | |
|---|---|---|---|
| 2454050 | 12/1979 | France | 362/341 |
| 6603641 | 9/1967 | Netherlands | 362/296 |
| 2043621A | 2/1980 | United Kingdom | . |

Primary Examiner—David H. Brown
Assistant Examiner—John E. Griffiths, Jr.
Attorney, Agent, or Firm—Lawrence R. Fraley

[57] ABSTRACT

A projection unit for use within a slide or film projector, or a microfilm viewer. The unit comprises an electrically insulative holder, a socket forming part of the holder's rear upstanding segment, a glass reflector secured to the holder's front segment such that its forward aperture aligns with an opening in the front segment, a tungsten-halogen lamp removably located within the socket and not engaging any of the interior surfaces of the reflector, and a slidable ejector (e.g., elongated bar member) for engaging the sealed end of the lamp and ejecting it out through the glass reflector's forward opening. Replacement of the lamp is thus possible without replacing the glass reflector. In addition, the invention maintains constant referencing characteristics to thereby enable successive, similar lamps to be precisely oriented within the reflector without the need for a prefocusing operation.

21 Claims, 6 Drawing Figures

PROJECTION UNIT WITH SEPARABLE LAMP CAPSULE AND SLIDABLE MEANS FOR EJECTING SAME

DESCRIPTION

CROSS REFERENCE TO COPENDING APPLICATION

In a copending application Ser. No. (SN) 253,332, filed Apr. 13, 1981 and entitled "Projection Unit With Separable Lamp Capsule and Means for Ejecting Same" (Inventors: E. G. Audesse et al), there is described a projection unit including a pivotal ejector member which pivots on the unit's metallic, U-shaped holder to engage the back surface of the sealed end portion of the unit's lamp to effect ejection thereof through the reflector's forward opening. This ejector is preferably a metal (e.g., steel) arm member which extends between the spaced lead-in wires of the lamp when the lamp is positioned within the unit's socket.

TECHNICAL FIELD

The invention relates to projection units for use in projection systems such as microfilm viewers and slide and movie projectors.

BACKGROUND

In many projection units which include a preformed glass reflector and projection lamp capsule (e.g., tungsten halogen) therein, the lamp capsule is retained in alignment with the reflector by employing a suitable cement (e.g., sauereisen) within the reflector and about the lamp's sealed end. Examples of such arrangements are shown in U.S. Pat. Nos. 3,314,331 (Wiley) and 3,639,750 (Anthonijsz). Use of cement or a similar permanent-type bonding agent prohibits separation of the lamp capsule and reflector in the event that replacement of either of these components is necessary. In almost all cases, it is only the incandescent lamp capsule which fails and needs replacement. The aforementioned permanent bond between lamp and glass reflector was believed essential to assure precise alignment between said components and between these members and other elements (e.g., film gate, projection lens) within the overall system. Alignment between the reflector and lamp was usually achieved using a precisioned instrument whereupon the assembled unit was ready for insertion within a respective socket holder arrangement, such as shown in U.S. Pat. No. 3,789,212 (Wagner). This latter positioning is usually accomplished by the projector's operator.

Mandatory replacement of both lamp and glass reflector has therefore resulted in unnecessary waste of material which in turn has added appreciably to the overall cost of operating such systems.

The projection unit of U.S. Pat. No. 4,156,901 (Haraden et al) was designed to eliminate the above undesired requirement by providing a retention member which is removable from within the reflector yet which also assures positive alignment of the unit's incandescent lamp with the reflector when said lamp is positioned therein. The retention member is secured to the lamp's sealed end and comprises a metallic "can", a preformed component of insulative material such as ceramic, or a combination of both. One particular disadvantage with the unit of U.S. Pat. No. 4,156,901 was the requirement for providing grooves, slots, etc. within the reflector's elongated neck portion to accommodate the retention member, which in turn included protruding tabs or similar items for being finally positioned within these grrooves. Yet another disadvantage of the unit of U.S. Pat. No. 4,156,901 was that the reflector opening to accommodate the unit's retention member had to be relatively large, thus reducing the available reflective surface area of the reflector.

The projection unit described in U.S. Pat. No. 4,219,870 (Haraden et al) was designed as an improvement over the afore-described unit of U.S. Pat. No. 4,156,901 by providing means whereby the retention member having the sealed end of the lamp therein may be removed from the front, concave reflecting portion of the glass reflector. The method of removal for these components in U.S. Pat. No. 4,156,901 was through the rear (neck) opening of the reflector. Rearward removal proved difficult in the complete system due to the typically limited accessibility in this region of the system. In U.S. Pat. No. 4,219,870, the resulting unit also required a metallic "can" on the end of the lamp capsule, as well as the aforementioned grooves, slots, etc. within the opening in the reflector's neck. This opening was substantially smaller, however, than that in U.S. Pat. No. 4,156,901 but in order to accomplish this it was necessary to provide a second, external springlike retention member as well as grooves in the neck's external surface to accommodate this second member.

In addition to the above, several versions of various front-loading projection units are described in Ser. No. 212,398, Ser. No. 212,469, and Ser. No. 212,470, all of which are assigned to the same assignee as the instant invention. All of these units require provision of slots or grooves within the glass reflector's neck portion in order to effect proper alignment of the lamp capsule therein. In addition, all require utilization of a metallic "can" or similar component secured to the end of the capsule (about the sealed end of the lamp itself) which must be inserted within the reflector's neck. As also in the case of the above units, this "can" member includes protuberances or similar projecting portions in order to align the capsule, said protuberances being slidably positioned within the corresponding grooves or slots of the reflector. Still further, the above units require some additional means of accomplishing capsule securement, such as a threaded nut, wireform, or locking cantilever spring member.

Yet another embodiment of a projection unit having a separable lamp capsule is described in Ser. No. 217,627, which is also assigned to the same assignee as this instant invention. In this unit, the capsule also includes an attached metallic "can" in addition to a pair of projecting flanges which slidably engage both the neck of the reflector and upstanding rear part of the unit's metallic U-shaped holder. Once the capsule was inserted, it is necessary in Ser. No. 217,627 to thereafter attach the preferred socket component, which itself constitutes a separate part of the system. It is thus necessary in this unit to precisely locate the flange portions relative to the capsule's filament structure in order to provide proper flament orientation within the reflecting region of the reflector. Such a procedure is understandably both costly and time-consuming.

It is believed, therefore, that a projection unit which provides for facile separation of the lamp component from within the unit's reflector and/or socket member without the foregoing disadvantages of the units such as described above would constitute a significant advancement in the art.

DISCLOSURE OF THE INVENTION

It is, therefore, a primary object of this invention to enhance the projection unit art by providing a projection unit which provides for precise alignment of the lamp component therein relative to the unit's reflector, facile removal (separation) of only the lamp from the unit should replacement thereof be necessary, and sound contact between the lamp and the unit's socket, which in turn provides a positive connection to the electrical circuitry of the projection system in which the invention is eventually utilized.

In accordance with the primary aspect of the invention, there is provided a projection unit which comprises an electrially insulative holder, a socket positioned on or forming part of the holder, a reflector located within the holder, a lamp removably positioned within the socket and aligned within the unit such that its envelope portion is located substantially within the concave reflecting region of the reflector and its sealed end portion is located substantially within the rear opening of the reflector when the lamp is positioned within the socket, and means for ejecting the lamp from the holder so that the lamp will pass through the reflector's forward aperture. The holder includes a front upstanding portion, this front portion defining a reference surface thereon such that when the reflector engages this front surface, it can be properly aligned with the holder's aperture and the lamp can be thereafter precisely oriented within the holder in precise relation to said front reference surface by virtue of the lamp's lead-in wires engaging a second reference surface defined within the socket and located at a predetermined, fixed distance from the front surface. The ejection means is slidably oriented substantially between the reflector and socket for engaging the lamp to cause ejection thereof.

BEST MODE FOR CARRYING OUT THE INVENTION

For a better understanding of the present invention together with other and further objects, advantages and capabilities thereof, reference is made to the following disclosure and appended claims in connection with the above-described drawings.

Figure 1:
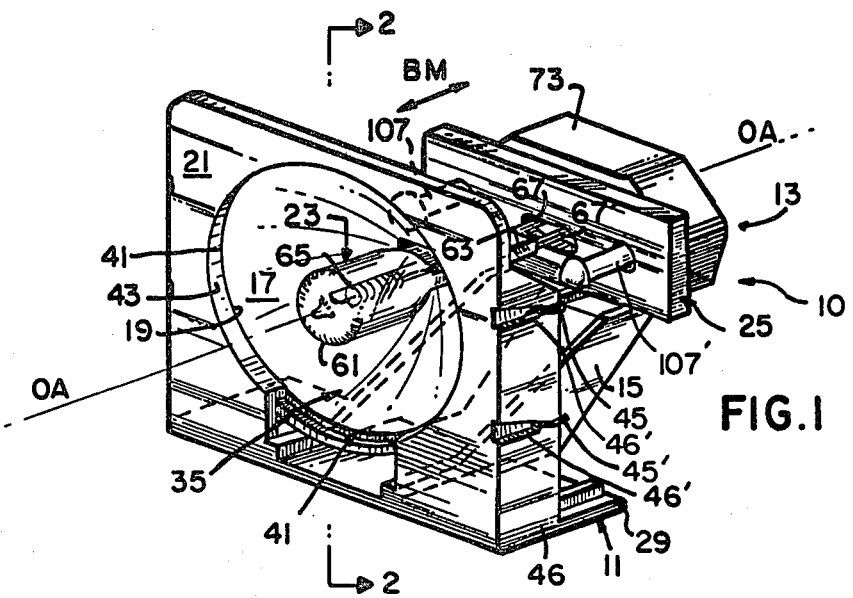
FIG. 1 is a perspective view of a projection unit in accordance with a preferred embodiment of the invention.
Figure 2:
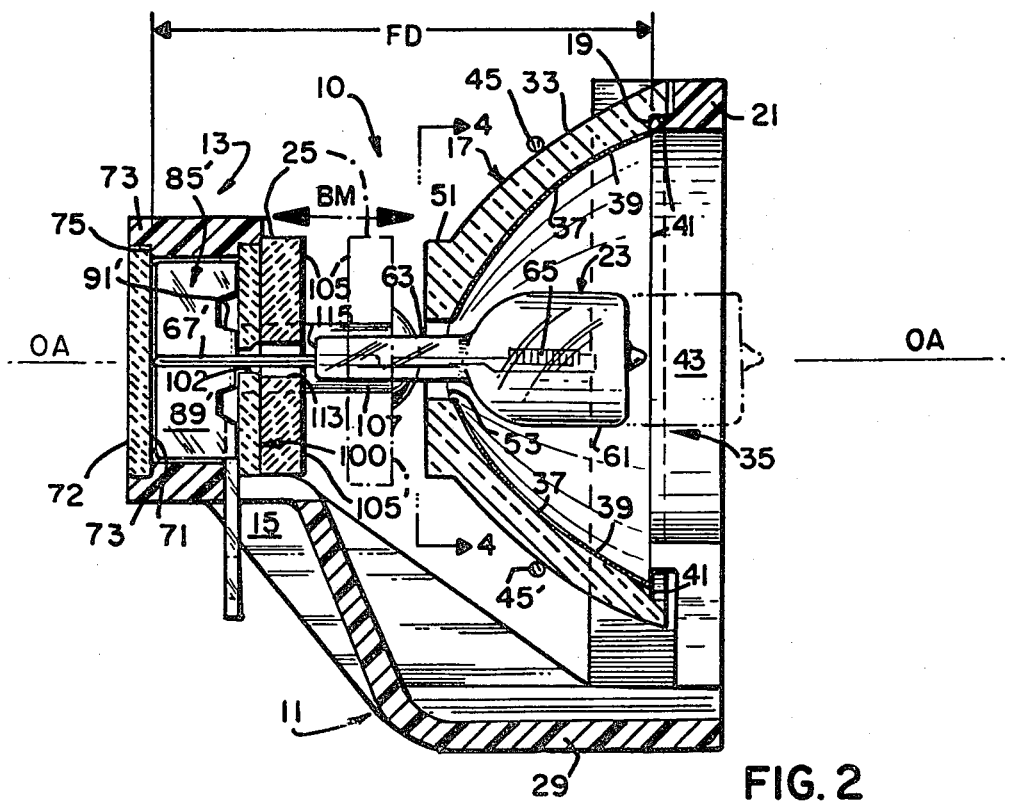
FIG. 2 is a slightly enlarged, side elevational view, partly in section, of the unit shown in FIG. 1 as taken along the line 2—2 in FIG. 1.

With particular reference to FIGS. 1 and 2, there is illustrated a projection unit 10 in accordance with a preferred embodiment of the invention. Unit 10 includes an electrically insulative holder 11, a socket 13 which is located on a rear upstanding portion 15 of holder 11 or forming a part thereof, a reflector 17 located within the holder and against a front surface 19 located on the flange of a forward or front upstanding portion 21 of holder 11, a lamp 23 removably located within socket 13, and a slidable ejection means 25 for providing facile removal of lamp 23 from socket 13 through the forward portion of reflector 17.

Holder 11 is preferably comprised of plastic material (e.g., polyphenylene sulfide) and of one-piece construction. In one embodiment of the invention, holder 11 was produced using an injection molding process. This was preferred to assure that precise, fixed orientation between critical surfaces of the holder was maintained (for reasons provided below). To provide this critical alignment, portions of the holder containing said surfaces were produced simultaneously in the same, unitary portion of the mold. As shown in FIG. 2, the molded holder also includes a base portion 29 from which both the front and rear portions (21 and 15, respectively) extend. Front portion 21 is oriented at 90 degrees to the flat base portion, while rear portion 15 is oriented at an angle preferably within the range of about 40 degrees to about 70 degrees. When unit 10 is to be positioned within a suitable projection system such as a microfilm viewer, slide projector, or film projector, the base portion of the holder will be suitably mounted (e.g., using screws) to a corresponding base or pedestal located therein. Holes or similar openings (not shown) will thus be provided within the base at suitable locations in order to facilitate this securement.

Reflector 17 is comprised of hardglass and includes a concave reflecting portion 33 which in turn defines a forward, light-emitting aperture 35 through which light from lamp 23 will be directed. Located on the internal surface 37 of the concave reflecting portion 33 is a reflective coating 39 which may comprise a thin metallic (e.g., aluminum) coating, or a dichroic coating typically used in known projection systems. A dichroic coating is preferred in view of its unique ability to allow infrared radiation to pass therethrough while still reflecting visible light in the direction desired. Heat dissipation is thus enhanced when using such a coating. The desired configuration (cross-section) for the reflective surface 37 is either elipsoidal or parabolic, while the configuration for the forward, light-emitting aperture 35 is circular. The concave reflecting portion 33 includes a front, planar reference surface 41 which rests against the planar, forward reference surface 19. As shown in FIG. 2, surface 41 is located on the forward-most portion of the reflector's concave reflecting portion 33 and thus lies in a plane substantially about the forward opening 35. Understandably, front reference surface 41 is established at a fixed, precise location with respect to the internal configuration of the reflector's reflecting surfaces and, when located in the abutting position shown in FIG. 2, assures precise orientation of the reflector's reflecting surfaces with respect to the circular opening 43 located within the planar front upstanding portion 21. Precisely orienting the front reference surface 41 relative to the reflector's reflecting surfaces is achieved by manufacturing the reflector in accordance with the teachings in the corresponding, above-identified application Ser. No. 217,627. As described therein, the typical glass reflector is formed in the female part of a mold which further includes a plunger and a neck ring member, the plunger passing through the neck ring to align with the female portion. Should a shifting occur between the neck ring and female portion, the plunger unfortunately may become misaligned with the female portion, the result being a finished product wherein the side walls vary unacceptably in thickness and the relationship between critical portions (e.g., the rear opening and rim exterior surface) thereof is unsatisfactory. Ser. No. 217,627 overcomes this problem by the unique teaching of forming the front referencing surface (41 in FIG. 2 of the instant drawings) using a defining surface (projection) on the plunger itself. Because the part (defining surface) of the plunger which defines this surface is always true to the remaining parts thereof which serve to define the other critical surfaces of the reflector (such as surface 37 and the reflector's rear aperture), slight misalignment between the neck ring and female mold portion will have no adverse effect on this relationship. The teachings of Ser. No. 217,627 are thus incorporated herein by reference.

Reflector 17 is held against the planar, semi-annular (see FIG. 1) surface 19 by a pair of wireforms 45 and 45' which pass over and engage opposing (upper, lower) external surfaces 46 of opposing flanges 46 (only one shown in FIG. 1) located on opposite sides of portion 21. Two slots 46' are provided in each flange to enable securement of the wireforms therein in the manner illustrated. This means of securement is not meant to limit the invention, however, in that once reflector 17 is precisely oriented with respect to the circular opening 43, this component can be permanently affixed using a suitable bonding cement. The "semi-permanent" form of retention illustrated in FIG. 2 is preferred, however, to enable facile removal of the reflector component from the unit 10 in the event that replacement and/or repair is necessary. Such a means of retention is also preferred in that it allows the system operator to substitute other reflectors having different reflecting capabilities should such substitution be desired.

Reflector 17 is also shown in FIG. 2 as including a narrower neck or apex portion 51 which includes a relatively small, substantially rectangular opening 53 therein. Attention is also directed to FIG. 4 wherein the apex portion 51 and opening 53 are illustrated in a rear view taken along the line 4—4 in FIG. 2. Apex portion 51 is substantially shorter than corresponding portions in reflectors of the prior art for several reasons. Specifically, it is not necessary in the invention that apex 51 support any part of lamp 23 therein. The neck does not, therefore, possess or need any internal slots, grooves, etc. Nor is it essential that the neck engage and be located within a corresponding aperture, slot, etc. within the rear part of holder 11, as was often necessary in many prior art units. Still further, the apex portion 51 does not require provision of slots or grooves within its external surface(s) in order to accommodate a separate retention (e.g., clamping) member for retaining the lamp in place and for assuring proper alignment thereof. Accordingly, reflector 17 can be produced at substantially less cost than such prior art components. As will be understood from the unique teachings cited herein, precise alignment of the invention's lamp is readily possible without the lamp being in physical contact with any portion of the glass reflector 17. With particular attention to FIG. 2, the lamp is shown in this spaced, non-contacting relationship with regard to the invention's reflector.

Figure 3:
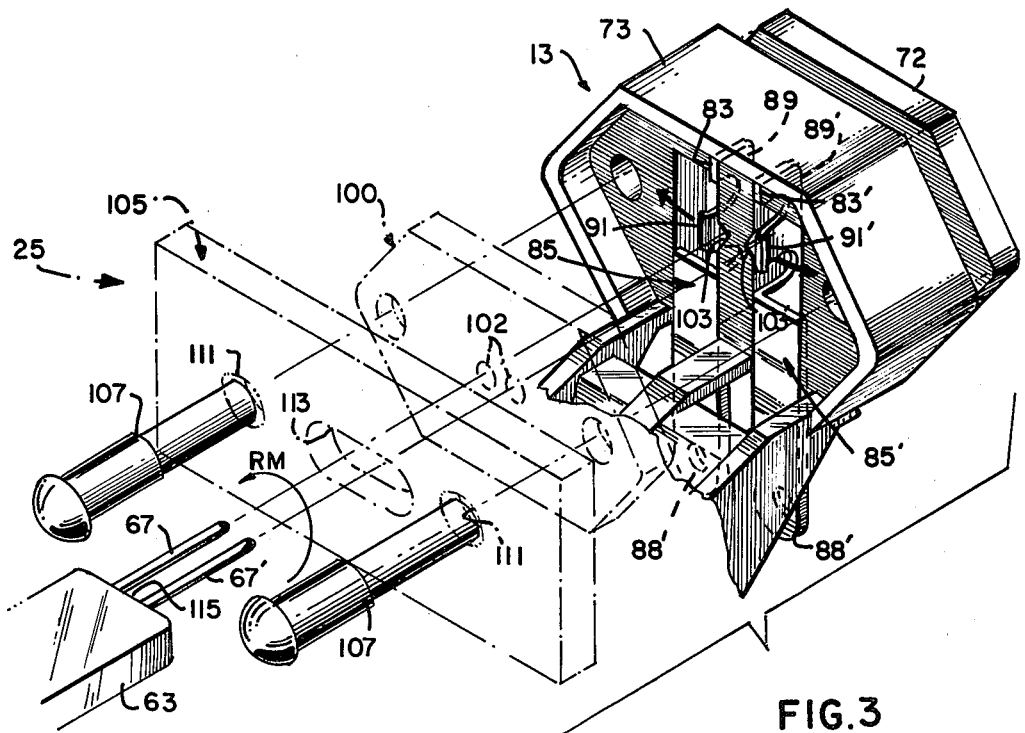
FIG. 3 is an enlarged, exploded perspective view of the socket component used in the present invention.
Figure 4:
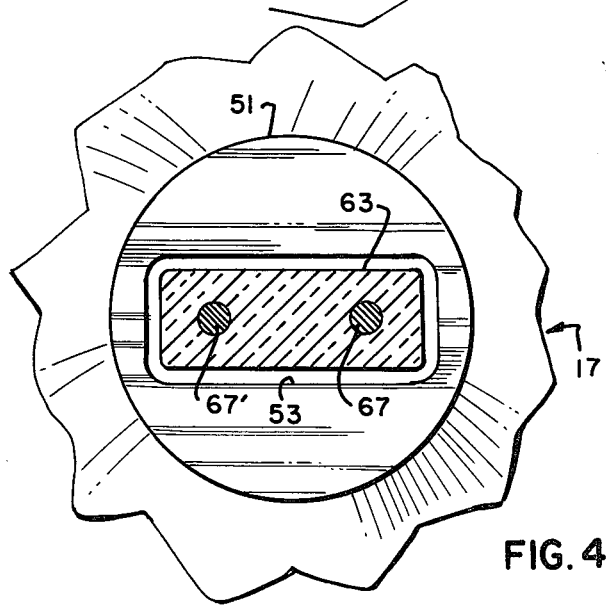
FIG. 4 is a partial, end elevational view of the invention's reflector, showing a projection lamp located therein, said view taken along the line 4—4 in FIG. 2.

Lamp 23 is of the tungsten halogen variety and includes an envelope portion, a press-sealed end portion 63 located immediately adjacent the envelope 61, a filament structure 65 (shown hidden in FIG. 2) located within the envelope, and a pair of projecting metal lead-in wires 67 and 67' (only one, lead-in wire 67' shown in FIG. 2) which extend from the sealed end 63 in a linear, substantially parallel fashion (see also FIGS. 3 and 4). The rigid lead-in wires are sealed within the press-sealed end 63 during formation thereof and thus are fixedly secured with respect to both the envelope and sealed end, as well as the filament structure 65. These wires also lie parallel to the lamp's longitudinal axis (not shown) and on opposite sides thereof. This axis understandably passes through the center of the filament structure 65 and thus lies coincidental with the reflector's optical ais (OA-OA) when lamp 23 is fully inserted within socket 13. Understandably, each of the lead-in wires 67 and 67' is electrically joined to the filament structure and serve to provide a current path thereto when the wires are located within the invention's socket and connected to the corresponding circuitry of the system in which unit 10 is located.

Lamp 23 is oriented within unit 10 in such a manner so as to be readily removable from within the invention's socket component 13 through the reflector's forward, light-emitting aperture 35 and the circular opening 43 of holder 11. This unique feature, to be described in greater detail below, thus permits removal of only the lamp of the invention in the event that this component fails. As stated above, it is the lamp component which usually fails in such systems and therefor only needs replacement thereof. The instant invention thus assures this feature without requiring additional replacement of any of the remaining components of the invention, particularly the glass reflector. In addition to this feature, the invention also assures that subsequent replacement lamps of similar configuration to lamp 23 can be readily inserted in a precise orientation identical to that of its predecessor, thus assuring optimum light output from the new component.

Lamp 23 is located within reflector 17 such that the optical axis OA-OA of the reflector passes through the center of the lamp's filament structure 65. This positioning relationship is considered necessary such that the light-emitting filament structure of lamp 23 will be properly oriented with respect to the reflecting surfaces of reflector 17.

When lamp 23 is positioned within unit 10, the envelope portion 61 is located substantially within and therefore surrounded by the aforementioned reflecting surfaces of the reflector's concave reflecting portion, while the sealed end portion 63 is located within the rear opening 53 of the reflector's narrower, apex portion. To assure that the lamp 23 is located at a proper depth (laterally) with respect to reflector 17, at least one of the projecting portions of the lead-in wires (67' in FIG. 2) positively engages and abuts against a second reference surface 71 defined by a back cover 72 of socket 13, said cover preferably ceramic and separable from the remaining part of the socket. This rear reference surface 71 is precisely oriented with respect to the aforementioned front reference surface 19 by portion 21 of holder 11. This is accomplished by producing both the portions of the socket against which back cover 72 is seated and that defining the planar, semi-annular front reference surface 19 simultaneously in the same, unitary part of the mold during the aforementioned injection molding process. The portion of socket 13 which has back cover 72 seated thereagainst is in the form of an insulative housing 73. Therefore, the surface (75) therein designed for accommodating the flat back cover is also of planar configuration and, as shown in FIG. 2, arranged parallel and at a fixed distance FD from the vertical, planar front surface 19. In summary, the simultaneous molding of the invention's insulative housing portion of socket 13 (which forms part of holder 11) and the upright, front portion 21 of the holder in the same part of the mold assures precise orientation between these surfaces in the final product. In addition, the rigidity of such a product (produced using such a process and the material defined) assures that this fixed, spaced relationship will be maintained during operation of unit 11, including at relatively high temperatures (e.g., approaching 260 degrees Celsius). It can therefore be seen from the above that at least one and preferably both of the projecting lead-in wires of lamp 23 are oriented within socket 13 relative to the original reference surface 19 so as to assure the proper alignment for the invention's lamp component. It is also seen that by precisely defining the termination (extreme end) of at least one of these lead-in wires relative to the filament structure 65, it is possible to precisely orient the filament structure laterally along axis OA—OA when the lamp is fully inserted within unit 10. It can also be seen that the lamp of the invention maintains this fixed relationship between the termination(s) and the filament structure by providing lead-in wires of rigid configuration and positively securing these members within the press-sealed end of the lamp. Although it has been stated that it is only necessary to precisely define the termination of one of the invention's lead-in wires with respect to the filament structure of lamp 23, it is preferred in the invention to do so with both lead-in wires 67 and 67'. Unit 10 therefore assures that subsequent placement of lamp designs identical to lamp 23 will result in such lamps being precisely oriented within the unit with respect to the holder and reflector components of the invention.

As stated, lamp 23 is of the tungsten halogen variety. Accordingly, the lamp's envelope and press-sealed end is preferably comprised of a hardglass material such as quartz or Vycor having a high melting point and low coefficient of expansion to permit wall temperatures approaching 600 degrees celsius. The corresponding filament structure (65) is comprised of tungsten, while the combustion-supporting gas within the envelope is chosen from the group consisting of iodine, chlorine, bromine, or other suitable halogens. Tungsten halogen lamps are ideally suited because of their self-cleaning capabilities during operation. During such operation, tungsten particles evaporate from the filament structure and collide with the respective halogen gas particles to combine chemically therewith. As a result of this chemical combination, tungsten particles are in turn deposited on the filament and the halogen gas released for subsequent combining. In one specific example, lamp 23 possessed an overall length (from tip to termination of lead-in wires) of approximately 1.500 inch. In this example, lead-in wires 67 and 67' each projected a distance of about 0.420 inch from end 115 and possessed an external diameter of 0.040 inch. The metal material for wires 67 and 67' is molybdenum.

Other lamps which may be used in the present invention, with only slight modification thereto, include those sold as part of what are presently referred to in the industry as rim mount lamp units. Such units typically include a glass reflector having the desired lamp cemented therein. These units are presently available under such ANSI designations as BJW, EET, ELS, DZP, ENV, ELE, DNF, ELV, ERX, EKS, DNE, ENZ, BAA, EKG, ELB, EPV, and EKN. Tungsten halogen lamps as used in such combined units typically possess a wattage of between 35 and 250 watts and operate at an operating potential of between 12 and 120 volts. Understandably, the invention is not limited to these lamps alone. It is readily possible in the invention to utilize tungsten halogen lamps operational at much broader wattage ranges (e.g., between 6 and 360 watts).

With particular regard to FIG. 3, there is illustrated an exploded perspective view of socket 13 in accordance with a preferred embodiment of the invention. Socket 13 preferably forms part (an extension) of the rear upstanding portion 15 of holder 11, and is therefore formed by the above molding process along with much of the remainder of the holder. Socket 13 includes the aforedescribed electrically insulative housing 73 having a pair of opposed slots 83 and 83' therein. Located within each of these spaced-apart slots is a metallic contact (85, and 85', respectively) which is adapted for being engaged by a respective one of the projecting lead-in wires from lamp 23. The function of each contact is to therefore electrically join the respective wire to the circuitry of the projection system in which unit 10 is located. Accordingly, each contact includes an extension portion (88, 88') which extends from the bottom of insulative housing 73 and is adapted for being electrically joined to a corresponding wire or connector forming part of the system's circuitry. Understandably, such a wire could be soldered to the respective extending end or, if a contact is utilized, this member could be located on said extending end and the wire joined thereto. Each contact includes a main body segment (89, 89') which is slidably positioned within the corresponding slot in housing 73. Each body is preferably frictionally located within the corresponding slot. As also shown in FIG. 3, each of the contacts are substantially similar (although reversed) in configuration and located within housing 73 such that the extending end portions thereof project from the bottom of the housing in a parallel fashion. In addition, each of the contacts includes a forward engaging segment (91, 91') which slidably engages the respective lead-in wire during insertion of lamp 23 within socket 13. Each engaging segment is resilient and adapted for being deflected (see directional arrows in FIG. 3) away from the direction of insertion during lead-in wire engagement. Only one contact (85') is illustrated in FIG. 2 for clarification purposes, said contact positively engaging and electrically connected to the fully positioned lead-in wire 67'. A planar, insulative front cover 100 (phantom in FIG. 3) is utilized to substantially cover the portions of contacts 85 and 85' located within slots 83 and 83' to thus provide added assurance of retention of these members within socket 13. In addition, the front cover is preferably ceramic to provide means for deflecting a portion of the heat generated by lamp 23 away from the plastic housing and contact members. Cover 100 includes two holes 102 therein through which wires 67 and 67' extend (pass) when the lamp is inserted within socket 13. Accordingly, the external diameter of each hole is slightly larger than those of the corresponding wire passing therethrough (see FIG. 2). As shown, cover 100 is located substantially between housing 73 and the apex portion 51 of reflector 17.

The preferred plastic material for insulative housing 73, as well as that for holder 11, is polyphenylene sulfide, a high temperature thermoplastic manufactured and sold by the Phillips Chemical Company, Bartlesville, Oklahoma, and sold under the tradename Ryton R-10. It is understood, however, that the invention is not limited to the use of a plastic material for housing 73. For example, it is possible to manufacture this entire component from ceramic material, thus enabling the socket to operate at substantially higher temperatures than one comprised of the aforementioned plastic.

Housing 73 of socket 13 also includes therein means for maintaining alignment the lead-in wires 67 and 67' of lamp 23 in a predetermined axial orientation within the socket while the leads are inserted therein. This alignment means comprises a pair of opposed, horizontal V-shaped grooves or indentations 103 and 103', each of which is adapted for receiving a respective one of the lead-in wires therein. Accordingly, grooves 103 and 103' are parallel and spaced apart the same distance as the parallel aligned lead-in wires. Of critical importance, the surfaces of housing 73 which define grooves 103 and 103' are formed in the same part of the mold used during the described injection molding process as are the surfaces (75) which accommodate (mate with) rear cover 72 and the front reference surface 19, thereby assuring precise orientation between these surfaces in the finished and subsequent components. In one example of the invention, wires 67 and 67' were spaced apart a distance of 0.125 inch. In this regard, the forward contacting portions 91 and 91' of each of the metallic contacts serve not only to positively engage the terminations of the lead-in wires during insertion but also to assist in directing these members into the receiving grooves. In addition, because these portions of the contacts are substantially resilient, they function to retain each of the lead-in wires within the respective groove (by pressing thereagainst). It can thus be seen that when lamp 23 is fully inserted within socket 13, rotational movement (RM in FIG. 3) by wires 67 and 67' about the central axis OA—OA is substantially prohibited. In the final, fully inserted position of lamp 23, the parallel lead-in wires of this component also preferably occupy a plane which passes through axis OA—OA and is substantially parallel to the planar base portion 29 of holder 11. This plane, perpendicular to the viewer in FIG. 2, is also therefore substantially perpendicular to both the forward reference surface 19 and the rear reference surface 71.

To enable the system's operator to readily remove the lamp 23 from its position within unit 10, the invention further includes a slidable ejection means 25. Means 25 comprises an elongated, planar bar member 105 which is slidably positioned on a pair of opposed slide members 107 which in turn are securely positioned within the insulative housing portion 73 of socket 13. Slide members 107 are preferably metal (e.g., brass or steel) pins which project from opposite sides of housing 73 and be parallel to optical axis OA—OA. Bar member 105, also preferably of ceramic material and thus able to deflect heat away from housing 73, includes two openings 111 therein, each for having a respective pin pass therethrough, to thus enable the bar to slide along the pins in the opposite directions (BM) indicated during lamp insertion and removal. In one example, openings 111 possessed a diameter of 0.160 inch and pins 107 each possessed an external diameter of 0.145 inch. Bar 105, having a slot 113 therein to enable both wires 67 and 67' to pass therethrough, positively engages the rear surface 115 of sealed end portion 63 of the lamp and causes ejection of the lamp when the system's operator in turn causes the bar to move forward (toward reflector 17). Accordingly, slot 113 is smaller than the corresponding press-sealed end so as to assure engagement therebetween. Bar 105 can be readily returned to its original position (FIG. 2, solid) upon insertion of a new lamp, the end surface thereof engaging the bar and forcing it rearward during said insertion. It is also within the scope of the invention to manufacture bar 105 from another type of insulative material (e.g., plastic), provided said material is capable of maintaining the desired degree of rigidity sufficient to enable lamp ejection without deformation thereof and the relatively warm temperatures at which unit 10 functions. It is understood that at no time during the above ejection does the bar member cause harm (e.g., fracture) the glass press-seal end of lamp 23. Several ejections of lamp 23 were accomplished in the instant invention without any such harm occurring.

Figure 5:
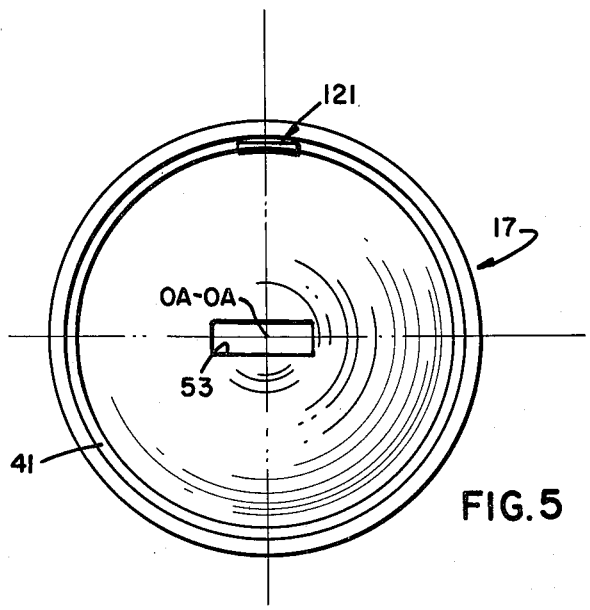
FIG. 5 is a front elevational view of the reflector of the invention, illustrating the relationship between the annular forward aperture, rear apex opening, and protuberance within the reflecting portion of the reflector for assuring a predetermined mode of alignment between the reflector's rear opening and the front upstanding portion of the invention's insulative holder.
Figure 6:
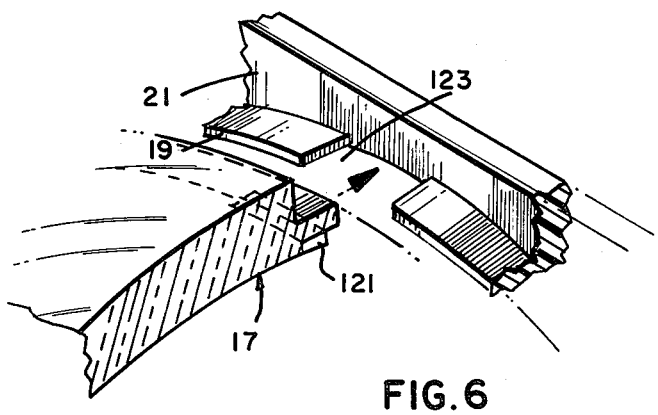
FIG. 6 is a partial, exploded perspective view showing the means for providing the aforedescribed alignment between the invention's reflector and holder members.

In FIGS. 5 and 6 there is shown the preferred means for aligning reflector 17 against surface 19 of holder 11 such that the rectangular rear opening 53 will be properly aligned with respect to this front surface, thereby assuring maximum clearance between the sealed end 63 of lamp 23 and the internal surfaces of the reflector's narrow apex portion when end 63 is oriented in opening 53. This alignment means comprises a boxlike protuberance 121 which extends forward from the top portion of the planar surface 41 of the reflector and snugly fits within a corresponding slot or recess 123 located within the top part of the flange defining reference surface 19 when reflector 17 is fully located within unit 10 and against surface 19. Protuberance 121 is formed during the aforedescribed glass molding operation using the same plunger utilized to define the remaining key surfaces of the reflector, thereby assuring that this member will be properly oriented with respect to opening 53 in both reflector 53 and subsequent reflectors produced using the same molding assembly.

There has thus been shown and described a new and unique projection lamp unit which provides not only for positioned alignment of the lamp therein, but also assures for facile and safe removal of the lamp should replacement thereof be desirable. As has been explained, the lamp component for use in the instant invention does not require a metallic or similar base component secured to any part thereof (particularly to the press-sealed end portion) in order to provide desired alignment of the lamp. The invention is thus capable of being manufactured at substantially less cost than many existing units. Other advantageous features of the invention have been fully described above. One of the most significant of these is that by its design, the invention maintains constant referencing characteristics to enable successive, similar lamps to be properly and consistantly aligned therein to a precise optical position, thus assuring optimum light output from such lamps without the need for a separate prefocusing operation as often required in many prior art units.

While there have been shown and described what are at present considered the preferred embodiments of the invention, it will be obvious to those skilled in the art that various changes and modifications may be made therein without departing from the scope of the invention as defined by the appended claims.

We claim:

1. A projection unit comprising:
an electrically insulative holder including front and rear upstanding portions, said front upstanding portion including an opening therein and defining a forward reference surface thereon;
a socket positioned on or forming part of said rear upstanding portion of said holder, said socket defining a rear reference surface thereon, said rear reference surface located at a predetermined, fixed distance from said forward reference surface;
a reflector located within said holder, said reflector having a concave reflecting portion defining a forward aperture and including a front reference surface thereon, and a rear apex portion defining an opening therein, said front reference surface of said reflector mating with said forward reference surface of said holder in a preestablished manner whereby said forward aperture of said reflector is aligned with said opening within said front upstanding portion;
a lamp removably positioned with said socket and oriented in a non-contacting relationship with said reflector, said lamp including an envelope portion located substantially within said concave reflecting portion of said reflector when said lamp is positioned within said socket, a sealed end portion adjacent said envelope portion and located substantially within said opening within said rear apex portion of said reflector when said lamp is positioned within said socket, and a pair of lead-in wires located within said sealed end portion of said lamp and having portions thereof projecting from said sealed end portion for being electrically connected to said socket when said lamp is positioned therein, at least one of said lead-in wires positioned within said socket in contact with said rear reference surface of said socket when said lamp is positioned therein; and
slidable ejection means located substantially between said socket and said reflector for engaging said lamp when sad lamp is positioned within said socket and ejecting said lamp from said socket whereby said lamp will pass through said forward aperture of said reflector and said opening within said front upstanding portion of said holder, said slidable ejection means comprising at least one slide member and an elongated bar member movably positioned on said slide member, said elongated bar member engaging said sealed end portion of said lamp to effect said ejection of said lamp.

2. The projection unit according to claim 1 wherein each of said forward and rear reference surfaces is substantially planar, said surfaces oriented substantially parallel to each other.

3. The projection unit according to claim 1 wherein said sealed end portion of said lamp does not include a base component thereon.

4. The projection unit according to claim 1 wherein said sealed end portion of said lamp is of substantially rectangular configuration in cross-section, and said opening within said apex portion of said reflector is of substantially rectangular configuration only slightly larger in area than said rectangular configuration of said sealed end portion.

5. The projection unit according to claim 1 including means for aligning said opening within said rear apex portion of said reflector in a predetermined relationship relative to said front, upstanding portion of said holder, said aligning means comprising a protuberance member on said concave reflecting portion of said reflector and a recess within said front upstanding portion of said holder, said protuberance member adapted for being inserted within said recess in a substantially snug manner when said reflector is positioned against said forward reference surface of said front upstanding portion.

6. The projection unit according to claim 1 wherein said holder is comprised of a material selected from the group consisting of ceramic and plastic.

7. The projection unit according to claim 6 wherein said holder is of one-piece construction and includes a base portion, said front and rear upstanding portions each oriented at a predetermined angle with respect to said base portion.

8. The projection unit according to claim 1 wherein said lamp includes a filament structure electrically connected to said lead-in wires and oriented within said envelope portion in a fixed relationship with respect to said portions of said lead-in wires projecting from said sealed end portion of said lamp.

9. The projection unit according to claim 8 wherein said envelope portion of said lamp is located within said concave reflecting portion of said reflector such that the optical axis of said reflector passes through said filament structure.

10. The projection unit according to claim 8 wherein said lamp is of the tungsten-halogen variety.

11. The projection unit according to claim 1 wherein said slide member is secured to said socket and projects therefrom.

12. The projection unit according to claim 11 wherein said bar member is comprised of ceramic material.

13. The projection unit according to claim 11 wherein the number of slide members is two, each of said members comprising an elongated pin, said pins projecting from said socket on opposing sides thereof.

14. The projection unit according to claim 13 wherein said bar member engages said sealed end portion of said lamp along a rear surface thereof to effect said ejection of said lamp, said bar member further including passage means therein for allowing said lead-in wires to pass therethrough when said lamp is located within said socket prior to said ejection from said socket.

15. The projection unit according to claim 1 wherein said socket includes an electrically insulative housing defining a pair of spaced-apart slots therein and a pair of electrical contacts, each of said contacts positioned within a respective one of said slots for being electrically connected to a respective one of said lead-in wires of said lamp when said lamp is positioned within said socket.

16. The projection unit according to claim 15 wherein said insulative housing includes means for aligning said lamp in a predetermined axial orientation within said socket wherein said lamp is positioned within said socket.

17. The projection unit according to claim 16 wherein said means for aligning said lamp comprises a pair of spaced-apart grooves, each of said lead-in wires being positioned within a respective one of said grooves in such a manner so as to substantially prevent rotational movement of said lead-in wires with respect to the longitudinal axis of said lamp.

18. The projection unit according to claim 15 wherein said socket further includes a front cover member positioned substantially between said housing and said reflector for substantially covering said electrical contacts within said housing, said front cover member including passage means therein for allowing said lead-in wires to pass therethrough to contact said electrical contacts.

19. The projection unit according to claim 18 wherein said front cover member is comprised of ceramic material.

20. The projection unit according to claim 18 further including a rear cover member secured to the rear portion of said insulative housing, said rear reference surface located on said rear cover member.

21. The projection unit according to claim 20 wherein said rear cover member is ceramic.

* * * * *